Jan. 13, 1942.   L. J. DE HOLCZER   2,269,440
CORK COMPOSITION
Filed Nov. 18, 1938

Inventor
Louis J. De Holczer
By Cushman Darby & Cushman
Attorneys

Patented Jan. 13, 1942

2,269,440

UNITED STATES PATENT OFFICE 2,269,440

CORK COMPOSITION

Louis J. De Holczer, Baltimore, Md., assignor to Crown Cork & Seal Company, Inc., Baltimore, Md., a corporation of New York Application November 18, 1938, Serial No. 241,288

3 Claims. (Cl. 215—39)

The present invention relates to cork compositions suitable for use as sealing materials. The composition includes cork granules and rubber, and the invention particularly resides in providing a composition of this character which is devoid of free sulphur.

Compositions including cork and rubber are known, but due to the presence of free sulphur have had an extremely limited use in the closure field. Free sulphur is objectionable, because (1) it reacts with the metal of a closure cap and/or container to disintegrate the same and discolor the product being sealed and (2) it will react with the contents being sealed so as to render the same unsaleable.

I have discovered that cork-rubber sealing compositions having a high sealing efficiency for use in the closure field may be produced which are substantially completely devoid of free sulphur. This result is attained by employing sulphur containing vulcanizing agents capable of liberating sufficient sulphur to bring about vulcanization without, however, forming an objectionable residue of free sulphur. In other words, I employ as the vulcanizing agent, for example, a polysulphide compound which is capable in the presence of heat of liberating one or more molecules of sulphur of such a reactive character as to readily combine with the rubber molecule to complete the vulcanization. In this manner, the necessity of having present elementary sulphur, prior to vulcanization, as has heretofore been attempted, is eliminated and likewise the presense of any free sulphur residue in the resulting product is prevented.

The cork-rubber composition product of this invention, moreover, has excellent flexibility, high compression and rebound, and a remarkably high tensile strength. Also, the composition is elastic, does not impart taste to the sealed product and is odorless. Of particular importance, the sealing material is inert with respect to the contents with which it may be brought in direct contact, and the composition is similarly inert to a metal closure and/or container and in the presence of the contents. Further, the cork-rubber composition is resistant to weak acids and alkalies such as are encountered in sealing a wide range of beverages and food products and is heat resistant up to temperatures of about 280° F. so that pasteurization and sterilization in the sealed container may take place and without charring the cork. The liner discs do not deteriorate in storage or when exposed to light and atmospheric conditions, and when applied as a sealing gasket or cushion, have a long life. In addition, the cushion material does not swell or shrink to any appreciable extent.

The material of the present invention, as pointed out, is useful for sealing purposes generally, but is particularly satisfactory as a liner disc or cushion for closures such as the usual crown, lug, and screw caps or caps of the skirted type. Caps provided with the sealing material form a highly efficient seal for liquids such as pressure beverages and milk as well as foodstuffs in general. That is to say, the sealing material is impermeable to both liquids and gases, the voids between the cork particles being even more completely filled than with the usual cork compositions. In addition to its use as an overall or cushion liner for caps, the present material is equally satisfactory as a ring liner, for example, in sealing Mason jar caps and caps of the type shown in the patent to Booth, No. 1,956,217, April 24, 1934.

An important object of the invention is to provide a sealing composition of cork and a binder, rubber, or cork and rubber which is resistant to mold growth. That is to say, I have discovered that metal salts of salicylic acid e. g., zinc salicylate when incorporated in the sealing material are highly efficient as mold inhibitors in sealing liners for closures. This discovery enables such compositions to be safely used under various climatic conditions without fear of objectionable mold growth.

In carrying out the present invention, I employ cork granules of any desired size. The invention is particularly useful with cork fines which in many instances have been considered as a waste product. Likewise, a very satisfactory composition can be produced by combining an appropriate amount of such fines with a suitable proportion of granules of larger sizes.

Preferably, crude rubber is employed, such as commercial crepe rubber or smoked sheet, but latex and synthetic rubber compositions, such as "Neoprene," "Thiokol" or "Buna" may be used.

Various sulphur-containing chemical compounds may be used as the vulcanizing agent, but they must be of a type which contain no free elemental sulphur and which on heating liberate a sufficient number of potentially reactive sulphur molecules, as will combine with the rubber to form the desired vulcanized product without leaving a free sulphur residue. As illustrative of preferred vulcanizing agents, I use thiuram sulfides, such as dipentamethylene-thiuram-tetrasulfide or tetramethyl-thiuramdisulfide and, in fact, any polysulphide or sulphur-containing chemical compound which is capable of liberating one, two or more molecules of sulphur during the process of vulcanization may be employed.

In connection with such vulcanizing agents, any suitable accelerating agent or combination of agents may be employed, but preferably agents which are compatible with the vulcanizing agent, such as tetramethyl-thiuram-monosulfide are used.

A preferred composition includes the constituents in the following percentage relationship:

| | Parts by weight |
|---|---|
| Crude rubber (creped or smoked sheet) | 50 |
| Zinc oxide | 3 |
| Whiting | 8 |
| Granulated cork | 30 |
| Wax (ceresin) | 4 |
| Stearic acid | 1 |
| Zinc salicylate | 1 |
| Dipentamethylene-thiuram-tetrasulfide | 2 |
| Tetramethyl-thiuram-monosulfide | 1 |
| Total | 100 |

The composition is prepared by mixing all of the ingredients except the cork in the usual rubber mill. After the mixture has been suitably milled to form a uniform mass, the cork is added and uniformly distributed throughout the rubber body. Thereafter, the product in a plastic state can be sheeted in any desired thickness or formed into rods or molded to any required configuration. The composition can be taken out of the vulcanizing mold in hot condition, since the compound after the release of pressure does not swell or puff in a manner characteristic of most rubber cork compositions.

Where the product is made in the form of rods, the cork discs can be sliced in the usual manner, and it is an important feature of the present invention that by reason of its high tensile strength and compressibility and rebound, discs may be produced of a thickness of substantially 14 to the inch or more, as distinguished from about 11 to the inch, which is the maximum with cork compositions at the present time. In addition, relatively thin sheets can be produced from which the liner discs or rings, as the case may be, are cut. Such sheets, discs and rings have a smooth, velvety surface feel.

The product of the present invention is water-resistant, but in some cases it is desired to increase the waterproof qualities, and for this purpose I use the ceresin wax, paraffin or other wax, or mixtures of ceresin and paraffin or other wax.

The stearic acid is employed as an emolient particularly for the accelerator.

The zinc salicylate may or may not be used, but its use is preferred, since I have discovered it to be a very reliable mold inhibitor not only in connection with the present composition, but in connection with cork compositions in general and rubber compositions. While I have referred to zinc salicylate, it is to be understood that various metal salts of salicylic acid are equally effective as mold inhibitors.

The vulcanizing agent, as above explained, may be any sulphur-containing chemical compound which in the presence of heat will liberate potentially reactive sulphur molecules capable of producing the vulcanizing of the composition without, however, leaving a residue of free sulphur.

In other words, and by way of example, any poly-sulfide compound may be used which is suitable as a vulcanizing agent and which has the property of liberating one or more molecules of sulphur under heat for combination with the rubber, so long as there is no free sulphur residue. Stated another way, the sulphur liberated from the vulcanizing agent must be in a reactive state as distinguished from free elemental sulphur, whereby such liberated sulphur will react immediately with the rubber molecule so as to form a compound which is stable and inert for all purposes to which the material is used.

The accelerator or accelerators employed are of a type which do not afford any source or residue of available elemental sulphur.

The zinc oxide employed is a catalyzer, while the whiting used is employed as a filler.

The resultant rubber cork composition has all of the various properties here and above set forth and is a stable product impermeable to both liquids and gases which does not swell or shrink in storage or in use.

The relationship of constituents above mentioned is for purposes of illustration, since it is to be understood that the amounts may be varied in accordance with the requirements of the composition. For instance, the percentage of wax may be very substantially increased, e. g., up to 20% or more. Also, while in the composition above described, the cork predominates by volume, as is usual in cork compositions for sealing purposes, in some cases the cork volume may be decreased and the rubber may predominate by volume. The purpose of the rubber is to bind the cork particles together resiliently and without impairing the cushion qualities of the cork particles, i. e., the inherent properties of the same.

In the accompanying drawing, I have for purposes of illustration, shown the present cork-rubber composition applied as a liner or cushion for closures.

Referring to the drawing.

Figure 1:
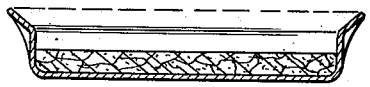
Figure 1 is an enlarged sectional view of a crown or crimped cap in which the composition forms the liner, it being understood, however, that the liner is equally useful in connection with screw caps, lug caps and pressed-on caps, as well as various types of skirted closures.
Figure 4:
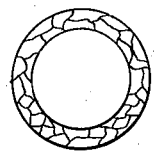
Figure 2:
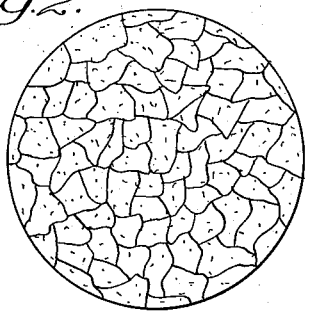
Figure 2 is an enlarged plan view of the disc used as the cushion liner in connection with Figure 1.
Figure 5:
Figure 3:
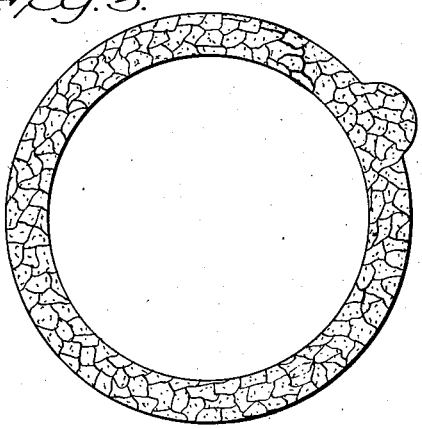
Figure 3 is a plan view of a ring such as, for example, is used in connection with a "Mason jar" cap.

Figure 4 is a plan view showing a sealing spot of aluminum, paper, chlorinated rubber or other material adhered to the cushion liner of Figure 2; and Figure 5 is a view of a cap having the cushion material in the form of a ring fixed in the sealing groove thereof, the cap skirt being adapted to be pulled over the lip of a bottle, as for example, a milk bottle being one example of a cap made in accordance with the aforesaid Booth patent.

While the advantages and usefulness of the material of the present invention in the closure art have been particularly emphasized, it is not intended that the invention shall be limited to this particular use, since the characteristics of the material make it suitable for a wide variety of uses, such as gaskets and others which will be apparent to those skilled in the art.

The term "sulfur vulcanized rubber" is intended to cover rubber vulcanized by means of a material containing chemically combined sulfur.

I claim:

1. A cap having a cork composition cushion liner comprising cork granules and sulfur-vulcanized rubber, said cushion liner being substantially devoid of free sulfur.

2. A cork composition comprising cork granules and sulfur-vulcanized rubber, said composition being substantially devoid of free sulfur.

3. A cork composition comprising cork granules, sulfur-vulcanized rubber and a mold inhibitor, said composition being substantially devoid of free sulfur.

LOUIS J. DE HOLCZER.